(No Model.)
E. E. DE KALB.
SPRING LATCH COUPLING.
No. 422,012. Patented Feb. 25, 1890.
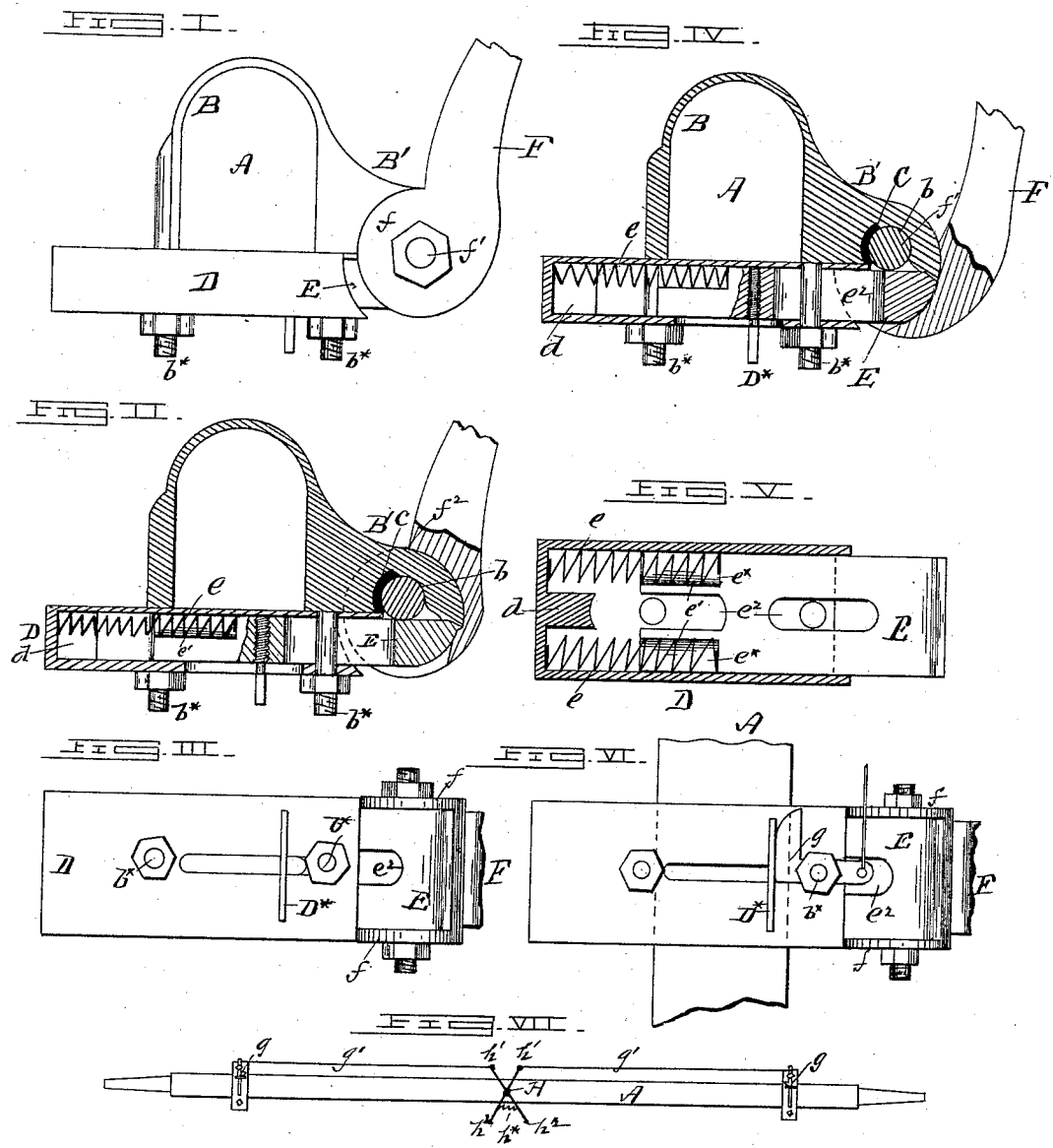

UNITED STATES PATENT OFFICE.

ENOCH E. DE KALB, OF SYRACUSE, NEW YORK.

SPRING-LATCH COUPLING.

SPECIFICATION forming part of Letters Patent No. 422,012, dated February 25, 1890.

Application filed October 26, 1888. Renewed August 1, 1889. Serial No. 319,381. (No model.)

*To all whom it may concern:*

Be it known that I, ENOCH E. DE KALB, a citizen of the United States, residing at Syracuse, in the county of Onondaga and State of New York, have invented certain new and useful Improvements in Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to couplings for various uses; and it constitutes what I have denominated a "spring-latch hinge-coupling," the principle of which is applicable in various situations where it is desired to couple one part to another.

The invention has for its object the production of a coupling which shall be capable of automatically receiving the part to be attached and of readily releasing it when it is desired to disconnect the parts. It is my object also to provide capability for releasing the part attached when in some positions, and for locking or automatically preventing such release when in others.

I propose in the present application to illustrate and describe the invention as constructed and applied for use as a thill-coupling for use upon vehicles; but it will be understood that the spirit and application of the invention contemplate the use of the leading features of this invention in any of the varied situations where it is desired to employ a coupler.

The construction and combination of parts by which the thill-coupling is produced are very compact and simple. I utilize the base-plate of the clip as a box or case, in which a spring-latch is incased, which, in conjunction with a socketed projection in front of the clip, constitutes the complete coupling by which the pin of the thill-iron is to be engaged.

I provide a construction of the thill-iron by which disconnection of the parts can be made only when the shafts or pole are dropped from the position of use upon the horse or horses, and also a construction by means of which the thill-iron can be disconnected irrespective of the position of the shafts or pole. With the latter of these constructions I propose to employ a detaching device operated from the body of the vehicle to detach the shafts or pole when the vehicle is in use in case the horses become ungovernable. This detaching device depends for its utility upon the sliding-latch feature of the coupling, as well as upon the construction of the thill-jaw.

The following detailed description will more fully disclose the nature and purpose of my invention and the manner in which I carry the same into effect as applied to a thill-coupling.

The accompanying drawings illustrate what I consider the best means for carrying the invention into practice in a thill-coupling.

Figure I is a side elevation of a thill-coupling in which the disconnection of the parts cannot be effected when the shaft or pole is in a substantially horizontal position, as when a team is hitched. Fig. II is a longitudinal section of the same. Fig. III is an inverted plan view of Fig. I. Fig. IV is a longitudinal section of a coupling in which disconnection can be effected when the pole or shafts are in a substantially horizontal position. Fig. V is a view of the bottom plate, showing the interior. Fig. VI is an inverted plan view of the coupling, showing the detaching means. Fig. VII is an inverted plan view of an axle, to which the coupling illustrated in Fig. IV is applied, and which is provided with means for operating both latches simultaneously from the body of the vehicle. Fig. VIII is a front elevation of the lever and operating-chain.

Similar letters of reference indicate corresponding parts in all the figures in which they occur.

A is an axle of any supposable vehicle to which a coupling is to be applied. B is the ordinary clip which surrounds such axle, provided with a forward extension B', in which is formed a socket $b$. In the socket $b$ is formed a depression or seat, in which a rubber cushion or buffer C is placed. Side walls upon three sides of the buffer-seat are afforded by the socket itself, while the fourth or under side is made by a projecting end $d^*$ on the base-plate of the clip, thus affording a seat from which the cushion will not fall when the thill-piece is removed.

D is the base-plate of the clip, which I utilize by making into the form of a case or box, in which a sliding bolt or latch E operates. The bolts $b^* b^*$ of the clip pass through the case or box D and are provided with nuts, as usual. The rear end of the box D is provided with a central lug $d$, which provides chambers $d'$ $d'$ on each side, in which one end of the springs $e$ $e$ project and find abutment against the rear wall of the box or case. The bolt or latch E is provided with corner grooves $e'$ $e'$, which receive the springs, and the ends $e^* e^*$ of the grooves or channels form the abutments for the front ends of the springs. Slots $e^2 e^2$, formed longitudinally in the body of the latch, permit the passage of the bolts $b^* b^*$, and also allow for the longitudinal movement of the latch. The forward end of the latch on the outer side is rounded or beveled, and by contact with the pin in the thill-piece will yield and cause the automatic engagement of the coupling with the thill-piece. The under side of the forward extension B' and the upper forward end of the latch may have an angular joint, as shown in Figs. 2 and 4. The latch is provided with a thumb-piece $D^*$, which projects out through a longitudinal slot in the bottom of the case or box D, and is taken hold of to withdraw the latch or bolt and permit the removal of the thill-piece.

F are the thill-pieces, to which the shafts or pole are attached. I form these thill-pieces with ears $f f$, which encompass the sides of the extension B', and a separately forward pin $f''$, which has nuts on its ends to permit it to be taken out and renewed when worn and to close the ears against the projected iron. At the front the ears $f f$ are met by the body of the thill-piece, and the width of this juncture may be extended to a greater or less extent, according as it is desired to form a coupling which cannot be uncoupled when the team is hitched, or one which may be caused to act as a detacher in case of an unmanageable team. If the juncture is extended up, as shown in Figs. I and II, when the shaft is on a substantially horizontal plane, as shown, the edge $f^2$ of the body of the thill-piece will lie back of the forward edge of the extension, so that even if the latch or bolt E is withdrawn the thill-piece cannot drop away from the clip; but when it is desired to disconnect when the shaft or pole is in position for use in driving the juncture between the ears $f f$ and the body of the thill-piece will not be carried so far up, but will terminate at a point in front of the forward end of the extension B', as shown at $f^2$ in Fig. IV, when the shaft or pole is in a substantially horizontal position. As constructed in Fig. II, the thill-pieces can only be uncoupled when the front end of the shaft or pole is dropped upon the ground or depressed to such a degree as to cause the edge $f^2$ to lie on a vertical line forward of the extension B'.

With the construction of thill-pieces shown in Fig. IV it is evident that a detaching means may be employed which will allow the shafts or pole to be freed from the vehicle when the team is hitched, and I have provided such, as will be seen in Figs. V and VI. A cam or bell-crank lever $g$ is pivoted upon the projecting end of one of the bolts $b^*$ of each clip. From these bell-crank levers extend rods $g'$ $g'$ to pivoted cross-levers at the center of the axle, whose pivot may be the coupling-pin of the vehicle. The ends $h'$ $h'$ $h^2$ $h^2$ of the crossed levers are kept distended by a spring $h^*$ applied on either side of the pivot. To the ends $h^2$ $h^2$ are secured chains or cables $i$ $i$, which unite upon one common chain or cable I, which extends up and is provided with a handle K, which lies inside of the vehicle-body and may be grasped by the driver and elevated to close the cross-levers, pull the rods $g'$ $g'$, and, through the medium of the cams or bell-crank levers $g$ $g$, retract the latches E and permit the thill-pieces to drop from the couplings, thus totally detaching the team from the vehicle. It is evident that any other system of leverage may be employed to affect the releasing of the latches from the body of the vehicle.

Having thus described my invention, what I claim, and desire to secure by Letters Patent, is—

1. The combination, with a clip having a forward extension with a socket opening downward, of a box forming the base-plate of the clip, and a sliding spring-latch having a rounded or chamfered front end to receive the pintle of the shaft and yield automatically to allow the pintle to be forced up in the seat, as set forth.

2. A coupling comprising a forward extension on a clip having a socket in it, a seat in said socket for a washer or buffer, a box or case forming the base-plate of said clip and having an extension $d^*$, which forms one of the walls of said seat, and a sliding latch in said box or case, as set forth.

3. The combination, with a clip, a socketed forward extension, as B', and a sliding latch for closing over the socket, of a thill-piece having the ears $f f$ and pin $f''$, and having a body extending sufficiently high and fitting snug upon the ears to prevent the thill-piece from falling out of the coupling when the shaft or pole is elevated, as set forth.

4. The combination, with the clips having downwardly-opening sockets and automatic sliding latches with chamfered ends and the thumb-pieces $D^*$, secured to the latches, of the bell-crank levers $g$, pivoted on the clips and operating against the thumb-pieces, rods $g'$, pivoted spring-levers, and connections $i$ $i$, as described.

In testimony whereof I affix my signature in presence of two witnesses.

ENOCH E. DE KALB.

Witnesses:
ALFRED WOLROTH,
GEORGE H. PENDLETON.